Patented Feb. 4, 1936

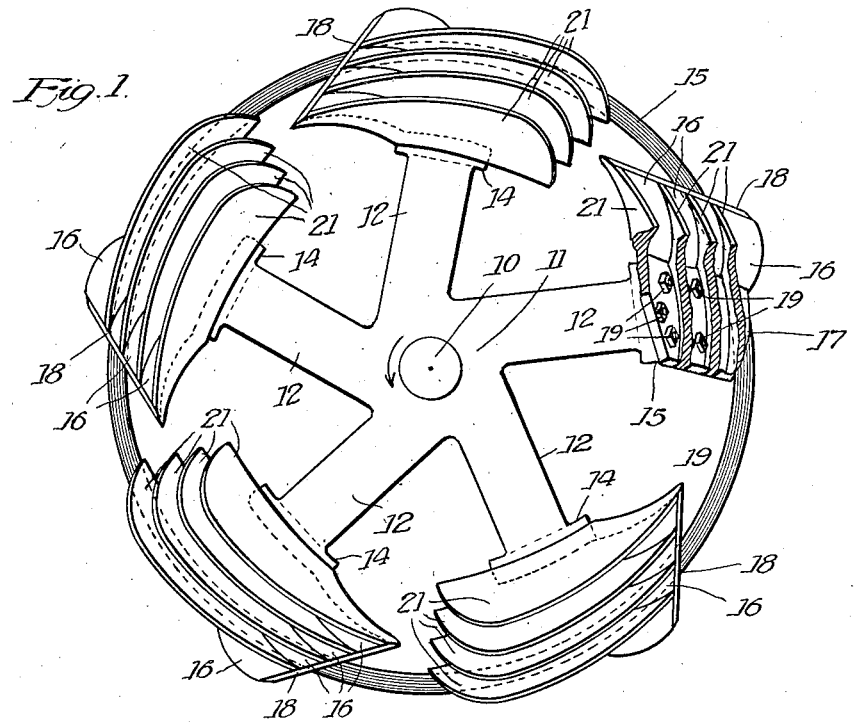
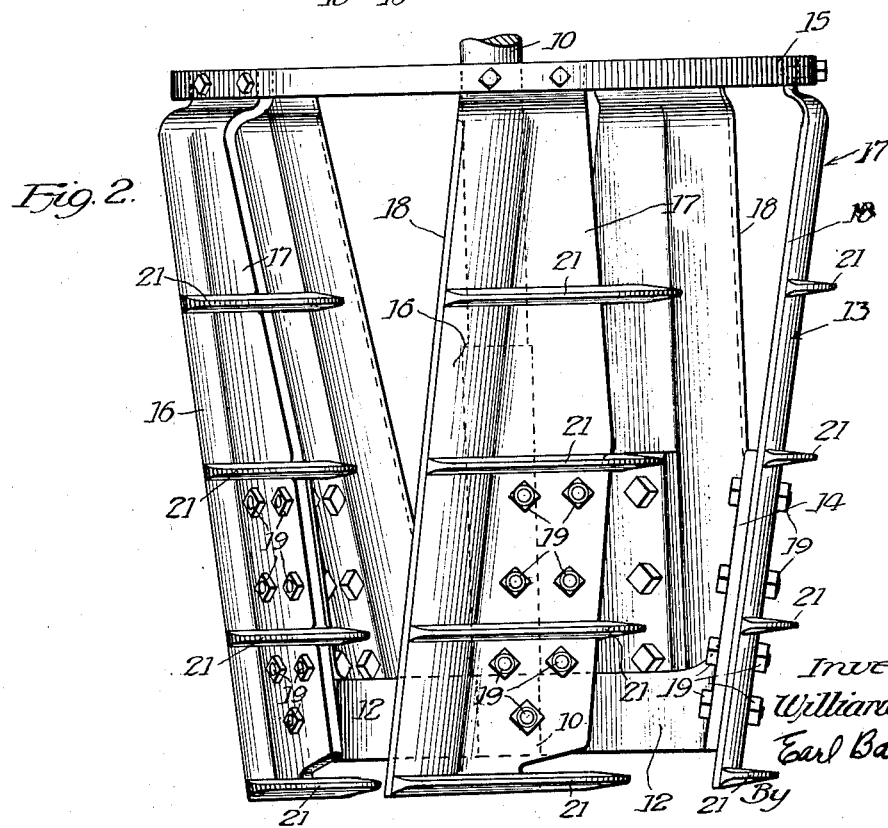

2,029,816

UNITED STATES PATENT OFFICE 2,029,816

CUTTER FOR HYDRAULIC DREDGES

Williard Rea Ewing, Libertyville, Ill., assignor to McWilliams Dredging Company, Chicago, Ill., a corporation of Illinois Application October 17, 1934, Serial No. 748,681

5 Claims. (Cl. 37—67)

This invention relates to cutters or cutter heads, as they are sometimes called, for use in connection with hydraulic or suction dredges.

As is well known in the art to which this invention relates, rotary cutters are employed on the intake end of the suction conduit of hydraulic dredges to break up and sever the earth or other material being excavated. In accordance with modern design, these cutters are rotated by a shaft connecting the cutter to some power source on the dredge. The mouth of the suction conduit is mounted eccentrically and below the center of rotation of the cutter, water and earth excavated by the cutter being drawn into the suction conduit by a pump on the dredge.

With such machinery, considerable difficulty has been experienced in preventing clogging of logs, stumps or debris in between the cutter blades and in the pump. In excavating in marsh land or swamps, a particular difficulty has resulted from the fact that logs float in between the blades of the cutter, pass through the suction conduit and enter the pump. When this occurs, damage of the pump and a shut-down of the dredge is inevitable.

Even if logs or stumps do not pass through the spaces between the cutter blades, they sometimes become stuck or lodged in the cutter, making it unbalanced and interfering with its operation, thus requiring a shut down.

It is an object of the present invention to remedy these and like defects resulting from the use of a rotary cutter, by devising means which will effectively prevent a cutter from clogging with logs, stumps or debris, and which will prevent such foreign material from passing through the cutter into the suction conduit and the pump, while, at the same time, not interfering with the normal operation of the cutter insofar as the excavation of earth is concerned.

It is another object of the invention to provide means for ejecting logs or other floating material from the cutter and for preventing such material from passing inside of the cutter blades.

It is still another object of the invention to provide means for limiting the "bite" of the cutter blades in logs or the like. In accomplishing this object, the cutter is enabled to chop up logs into pieces small enough to pass through the hydraulic conduits and pump of the dredge.

Other objects and advantages reside in certain novel features of the arrangement, as will be apparent from the following description, taken in connection with the accompanying drawing, in which:

Figure 1 is an end view of a cutter having one embodiment of the invention incorporated therein, certain parts being cut away to better illustrate the construction.

Figure 2 is a plan view of the cutter shown in Figure 1.

Referring to the drawing in detail, reference numeral 10 indicates the shaft upon which the cutter is mounted. The shaft may be supported by bearings on what is called a "ladder". The ladder and bearings for the shaft are not shown in the drawing since they form no part of the present invention. Likewise the suction conduit of the dredge has not been shown although it is to be understood that the mouth of the suction line would be located beneath the shaft 10 and inside the path of rotation of the cutter blades, in accordance with the usual practice.

The cutter proper includes a hub 11, keyed or otherwise integrally secured to the shaft 10, spokes 12 radiating from the hub and cutting bars or blades 13 bolted to the spokes. As indicated in Figure 2, the hub 11 and spokes 12 are positioned on the forward end of the shaft 10 (the lower end of the shaft, as shown in Figure 2). Each spoke has a rearwardly projecting portion 14 which supports and is bolted to one of the blades 13.

The blades 13 are thus supported on the shaft 10 only at their forward end. To strengthen the cutter, the rear ends of the blades may be braced by a ring 15 bolted thereto.

Each blade 13 is of such a construction that it has a cutting and excavating portion 16 and a supporting portion 17. (See cut-away portion of Figure 1.) The portion 16 has a forward cutting edge 18 and is so shaped as to provide a concave surface for causing earth or other material loosened by the cutting edge to move toward the center of the cutter. For this purpose, the cutting edge 18 is farther from the axis of rotation than any other part of the blade.

The supporting portion 17 of each blade is spaced radially inwardly from the portion 16 with which it is integral.

By bolts 19 connecting the portions 17 of the blades to the projections 14 on the spokes 12, a construction is obtained in which the portions 16 of the blades are in the best position for excavating when the cutter is rotated.

It is to be noted that in the cutter illustrated, care has been exercised to keep the interior free from structural obstructions which might prevent the cutter from operating to efficiently convey the material being excavated from the blades 13 to the mouth of the suction line located within the cutter.

The blades 13 are supported at their forward ends only, there being no spokes or other obstructions except those marked 12 at the front end of the shaft 10. The cutting edges 18 of the blades are so positioned as to not only be disposed on an imaginary conical surface, (the apex of which would be at some point in advance of the cutter) but these edges are also slightly spiraled about the axis of shaft 10.

The advantages of an open cutter of this nature are to some extent lost, however, if logs or other debris wedge between the blades or enter the cutter and collect along the shaft 10 or enter the suction line, which, as stated above, is normally positioned just below the shaft 10 inside the cutters. Everything which enters the suction line passes directly to the pump, and it is of primary importance in successfully operating a dredge to protect the pump from large objects such as logs or stumps although the pump is so designed to readily handle small pieces of wood.

In accordance with applicant's construction, somewhat elaborate precautions have been taken to prevent foreign material from entering the cutter and passing to the pump. For this purpose, each blade 13 is provided with a number of peculiarly shaped guards or fingers, designated 21.

Each guard consists of a tapered bar of somewhat triangular shape in cross-section, and having a pointed forward end adapted to be disposed at or immediately behind the cutting edge of the blade to which it is to be attached. The rearward end of each bar is curved rather sharply inwardly as shown in Figure 1, and the entire rear portion of each guard overhangs or extends rearwardly beyond the supporting portion 17 of the blade.

The guard on the forward end of each blade on the cutter, that is the lower guard on each blade as viewed in Figure 2, and the guards nearest the observer when viewed as illustrated in Figure 1, is connected only to the excavating portion 16 of each blade, these particular guards being in advance of the receding edge of the supporting portion 17 of each blade.

These guards 21 are arranged in parallel on the outer surface of each blade 13, being welded or otherwise rigidly secured thereto. They are so disposed as to have their longitudinal dimension in planes at right angles to the axis of shaft 10.

In the present arrangement, wherein the blades 13 are disposed on the surface of a cone, the guards 21 near the rear end of the cutter are longer than those at the forward end. Thus the distances between rear ends of the guards and the nearest points on the blades in the rear thereof, are the same in each case.

These guards are not to be confused with teeth for aiding in the excavating operation. Excavating teeth are well known and have been used for years in this art. A distinguishing feature between the teeth of the prior art and the present arrangement is that in the prior art constructions, the teeth project forward from the cutting edge of the blades, and extend outside of their trajectory, whereas in the present construction, they extend rearwardly from the blade and do not project radially beyond the circle described by the cutting edge of the blades as they rotate. Because of this location, the guards perform special functions.

Because the guards extend rearwardly from the teeth, they prevent large objects, such as stumps, from wedging in between the blades, or passing between the blades and sucked into the pump.

In operating a dredge having a cutter of conventional design, this is very likely to happen. On the other hand, it has been found that in operating a dredge provided with a cutter constructed in accordance with the present invention, that, when the cutter is moved in contact with a stump while it is rotating, it either passes over the stump or is knocked a slight distance back and away from the stump due to the contacting of the guards and the stump. Likewise, when a log or other object floats into contact with the cutter, it is ejected by the guards.

Because of their construction, the guards also perform another function. They aid the blades in chopping up or digesting logs, stumps or the like, so that they can pass through the pump on the dredge. The guards extending rearwardly from one blade, limit the "bite" of the succeeding blade so that the latter, instead of being driven into the log or stump merely chops off an outer portion thereof. This process continues until the object encountered is entirely chopped up and removed. In this way hydraulic dredges can be used for work heretofore deemed unsuitable or at least impractical, for their operation.

It is to be noted that while the guards 21 thus protect and aid the cutter and pump in performing new functions, they do not interefere with the primary or normal functions of the machinery in excavating and moving earth, the guards being so disposed as not to interfere in the least with the position of the blades with respect to the earth being excavated.

While only one embodiment of the invention has been shown and described herein, it is obvious that various changes may be made without departing from the spirit of the invention or the scope of the annexed claims.

I claim:—

1. In a cutter for a hydraulic dredge, a hub adapted to be rotated about an axis at the center thereof, spokes radiating from said hub, blades secured to said spokes, said blades having cutting edges disposed upon an imaginary conical surface, the apex of which is in advance of said hub and on said axis, said blades also being slightly spiralled about said axis and having a small portion of their cutting edges in advance of the hub and a large portion of their cutting edges in the rear of said hub, each blade receding from the portion of the cutting edge in advance of said hub, and guards secured to each of said blades, said guards consisting of members disposed in parallel on the outside of said blades and extending rearwardly therefrom in planes at right angles to said axis, at lease one of said guards on each blade being positioned on the portion thereof disposed in advance of the hub and overhanging the receding portion of said blade, all of said guards being positioned entirely within the surface of revolution described by movement of said blades.

2. In a hydraulic dredge having a pump, a cutter comprising a number of blades fixed to each other and arranged to rotate about a common axis, and non-fouling guards on said blades for preventing logs, stumps and debris from interfering with the operation of said blades or said pump, each of said guards consisting of a solid member rigidly secured to the outside of a blade and extending from a point near the cutting edge of the blade to a point some distance in the rear of said blade, the outer and rearward portion of said member being curved.

3. In a hydraulic dredge having a pump, a cutter comprising a number of blades fixed to each other and arranged to rotate about a common axis, and non-fouling guards on said blades for preventing logs, stumps and debris from interfering with the operation of said blades or said pump, each of said guards consisting of a solid member rigidly secured to the outside of a blade and extending from a point near the cutting edge of the blade to a point some distance in the rear of said blade, the outer and rearward portion of said member being curved, said guards being disposed in planes substantially at right angles to the axis of rotation of said blades, and said guards also being positioned entirely within the surface of revolution described by movement of said blades.

4. A cutter for a hydraulic dredge, comprising a supporting base, blades mounted in spaced relation on said base, each of said blades having a cutting and excavating portion and a supporting portion, the supporting portion of each blade being secured to said base, the structure being such that the supporting portions of the blades are spaced radially inwardly from the cutting and excavating portions, and guards secured to each of said blades, each guard comprising an elongated member having a forward portion disposed on the outside of the cutting portion of a blade immediately behind the cutting edge thereof and a rear portion overhanging the supporting portion of the blade.

5. A cutter for a hydraulic dredge comprising an open supporting base structure, blades mounted in spaced relation thereon, each of said blades having a cutting and excavating portion and a supporting portion, the supporting portion of each blade being secured to said base structure at one end only, the arrangement being such that the supporting portions of the blades are spaced radially inwardly from the cutting and excavating portions, and guards secured to each of said blades, each guard comprising an elongated member having a forward portion disposed on the outside of the cutting and excavating portion of said blade and a rear portion overhanging the supporting portion of said blade thereby preventing the passage of large objects into the open supporting base structure.

WILLIARD REA EWING.